Aug. 16, 1966 J. HUMPHRIES ETAL 3,267,407

PROGRAMMABLE MATRIX

Filed Jan. 24, 1964

INVENTOR
JOHN HUMPHRIES
ROBERT B. PIERCE

BY A. C. Smith
AGENT

United States Patent Office 3,267,407
Patented August 16, 1966

3,267,407
PROGRAMMABLE MATRIX

John Humphries and Robert B. Pierce, Palo Alto, Calif., assignors to Hewlett-Packard Company, Palo Alto, Calif., a corporation of California Filed Jan. 24, 1964, Ser. No. 340,015
4 Claims. (Cl. 339—18)

This invention relates to a programmable matrix for use in system programming.

Conventional programmable matrices typically comprise two adjacent planes of continuous contact strips oriented at right angles to each other; both the planes and contact strips being insulated from each other. Conducting pins are inserted to interconnect contract strips in one plane with contact strips in the other plane at selected intersections for providing a desired program. The large size of the contact strips and the construction required to properly mount and insulate them make the end product bulky and unsuited for high density packaging.

Accordingly it is the principal object of this invention to provide a low cost and highly reliable programmable matrix which is greatly reduced in size.

In accordance with the illustrated embodiment of this invention there is provided a circuit board including portions of a matrix and conductive receiving terminals therefor. Unidirectional shorting pins forming other portions of the matrix are frictionally mounted in selected ones of the receiving terminals to provide a desired program.

Figure 1:
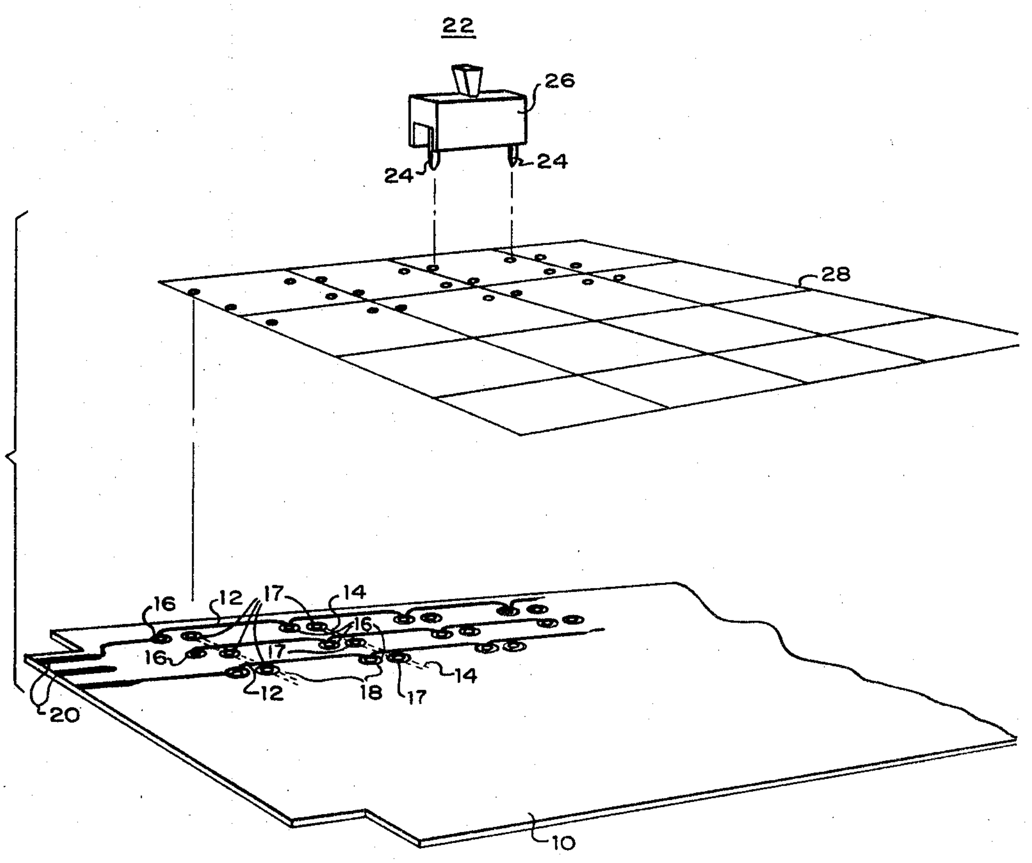
Figure 2:
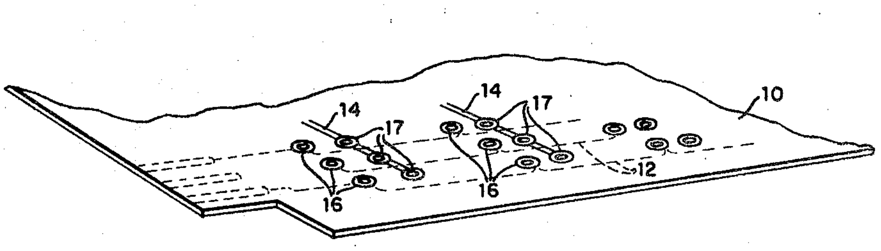

Other and incidental objects of this inventon will be apparent from a reading of this specification and an inspection of the accompanying drawing in which FIGURE 1 is a pictorial view of a programmable matrix according to this invention and FIGURE 2 is a pictorial view of the bottom side of the matrix board of FIGURE 1.

Referring to FIGURE 1 and 2 there is shown a rigid layer of dielectric material 10 having a plurality of adjacent conductive paths 12 fixed to the top surface thereof. Similarly a plurality of adjacent conductive paths 14 are oriented normal to the conductive paths 12 and fixed to the bottom surface of layer 10. Vertical rows of conductive receiving terminals 16 and 17 disposed in layer 10 alternately intersect paths 12 and 14 to form adjacent rows of terminal pairs 18. This part of the programmable matrix as well as the appropriate input and output terminals 20 located at one end of layer 10 is formed by printed circuit techniques.

Conducting plugs 22 forming another part of the matrix include a pair of spring loaded contact pins 24 firmly embedded in an insulating hood 26 and disposed for frictional mating with the receiving terminal pairs 18 to interconnect selected points along conductive paths 12 and 14. A diode is mounted in the hood 26 intermediate the pair of contact pins 24 to provide a unidirectional conducting plug. However, some other circuit element or a simple conductor may be used to form a suitable conducting plug for any application. Conducting plugs 22 are inserted in selected terminal pairs 18 indicated by removable overlay 28 to provide a desired program.

The program may be changed by simply replacing overlay 28 with another overlay indicating the desired program and reinserting conducting plugs 22 in the selected terminal pairs 18. Any number of programs may be indicated on overlays which require minimal storage space and successively programmed on the matrix of this invention which occupies a minimum of instrumentation space.

We claim:

1. A selectively programmable matrix for providing a selected program, comprising:

a dielectric layer having top and bottom surfaces;

a first plurality of conductive paths attached to the top surface of said dielectric layer and extending in a generally common direction therealong;

a second plurality of conductive paths attached to the bottom surface of said dielectric layer and extending in a generally common direction therealong for passing beneath said first plurality of conductive paths in intersecting relationship thereto to form iterative sections of the matrix;

a plurality of contact receiving terminal pairs attached to said dielectric layer, each of said terminal pairs having one conductive terminal which is conductively connected to one of said first plurality of conductive paths and having another conductive terminal which is laterally spaced a selected distance from said one terminal and conductively connected to one of said second plurality of conductive paths; and at least one conducting element having a pair of conductive contacts for frictionally and removably mating with a selected one of said contact receiving terminal pairs to provide the selected program.

2. A selectively programmable matrix as in claim 1 wherein for each of said contact receiving terminal pairs:

said one conductive terminal extends through said dielectric layer and is conductively connected only to said one of said first plurality of conductive paths; and said other conductive terminal extends through said dielectric layer and is conductively connected only to said one of said second plurality of conductive paths.

3. A selectively programmable matrix as in claim 2 wherein said conducting element comprises:

an insulating casing supporting said contacts, each of said contacts including an upper portion mounted within said casing and a lower portion protruding from said casing for frictionally and removably mating with said receiving terminals; and circuit means for conducting at least one direction being connected in said casing between the upper portions of said contacts.

4. A selectively programmable matrix as in claim 3 including means disposed adjacent to one surface of said dielectric layer for indicating the required placement of said conducting element to provided the selected program.

References Cited by the Examiner

UNITED STATES PATENTS

| | | | |
|---|---|---|---|
| 112,798 | 3/1871 | Freeman | 339—18 |
| 231,708 | 8/1880 | Gilliland | 339—18 X |
| 1,747,069 | 2/1930 | Gould et al. | 339—19 X |
| 2,568,535 | 9/1951 | Ballard | 339—17 X |
| 2,941,053 | 6/1960 | Braunstein et al. | 399—18 X |
| 2,969,517 | 1/1961 | Gluck | 339—17 |
| 3,065,439 | 11/1962 | Krause | 339—18 |
| 3,165,731 | 7/1965 | Gerlach et al. | 317—112 X |

FOREIGN PATENTS

| | | |
|---|---|---|
| 70,102 | 10/1958 | France. |
| 123,170 | 2/1919 | Great Britain. |
| 344,668 | 3/1931 | Great Britain. |

EDWARD C. ALLEN, *Primary Examiner.*

PATRICK A. CLIFFORD, *Examiner.*

UNITED STATES PATENT OFFICE

CERTIFICATE OF CORRECTION

Patent No. 3,267,407 August 16, 1966

John Humphries et al.

It is hereby certified that error appears in the above numbered patent requiring correction and that the said Letters Patent should read as corrected below.

Column 1, line 15, for "contract" read -- contact --; line 37, for "FIGURE 1 and 2" read -- FIGURES 1 and 2 --; column 2, line 43, for "at least" read -- in at least --.

Signed and sealed this 1st day of August 1967.

(SEAL)
Attest:

Edward M. Fletcher, Jr.
Attesting Officer

EDWARD J. BRENNER
Commissioner of Patents